April 5, 1938.　　　H. L. NIEMEYER　　　2,113,409
INSECT TRAP
Filed Feb. 25, 1935
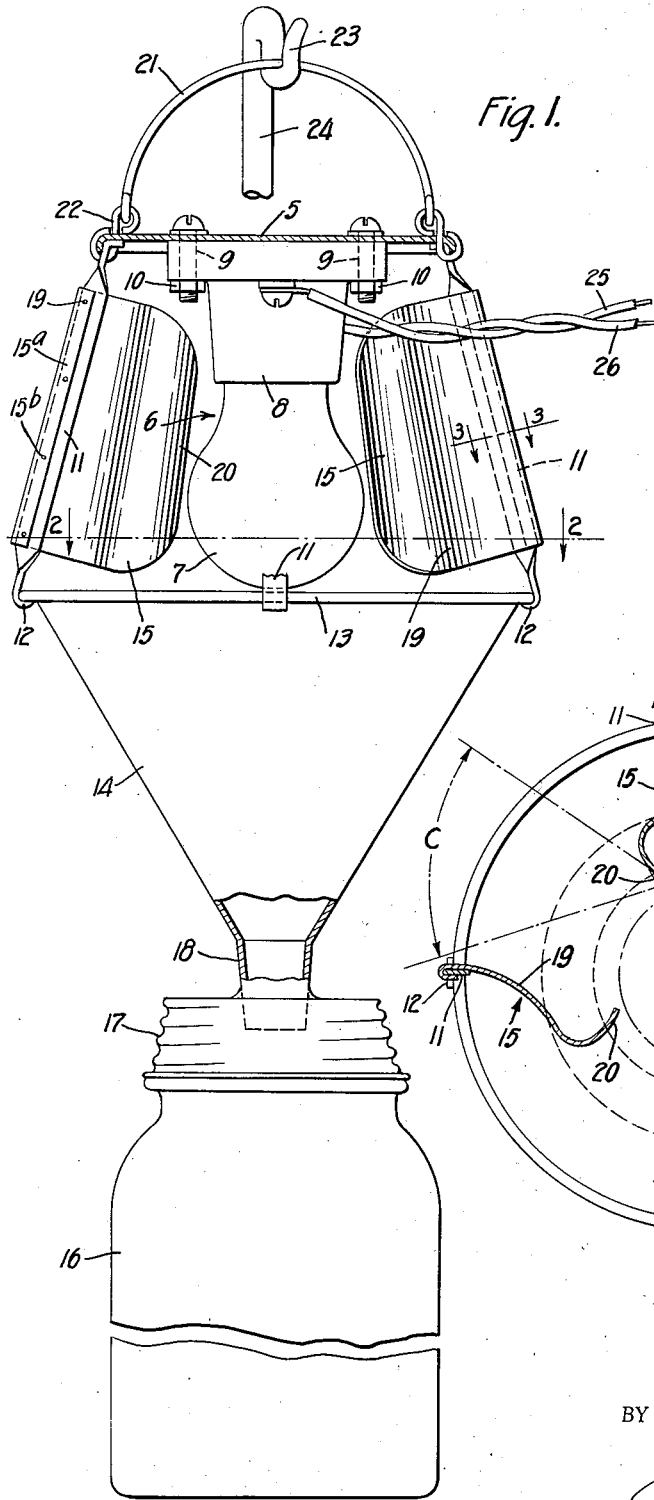
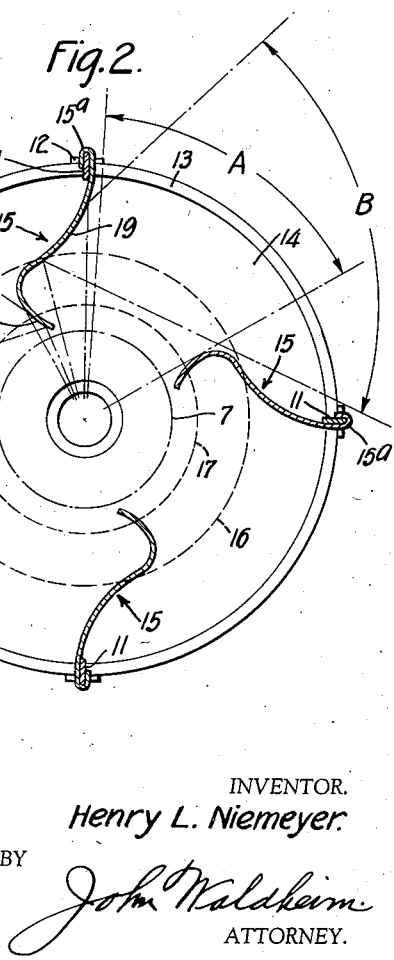
INVENTOR.
Henry L. Niemeyer.
BY
John Waldheim
ATTORNEY.

Patented Apr. 5, 1938

2,113,409

UNITED STATES PATENT OFFICE 2,113,409

INSECT TRAP

Henry L. Niemeyer, Elizabeth, N. J.

Application February 25, 1935, Serial No. 7,989

6 Claims. (Cl. 43—113)

This invention relates to insect traps and more particularly to the kind which are provided with an attracting device about which are arranged several baffle plates by which the flight of the insect or bug is broken to cause it to drop into a receptacle arranged beneath the baffle plates.

A feature of the invention relates to the means of securing the attracting device, baffle plates and receptacle to each other so that they may be supported as a unit by a hook to suspend the trap a distance above the ground.

Another feature of the invention relates to the construction of the baffle plates so as to render them highly efficient for the purpose of reflecting the light of the attracting device which is herein shown as a lamp.

A further feature of the invention relates to the manner of attaching the baffle plates to their supporting arms.

Other features and advantages will hereinafter appear.

In the drawing which forms part of the specification,

Fig. 1 is a side elevation, partly in section, of the device showing it suspended from a suitable hook;

Fig. 2 is a section taken on the line 2—2 of Fig. 1; and

Fig. 3 is a sectional view taken on the line 3—3 of Fig. 1 showing the manner of securing the baffle plate to its supporting arm.

Similar reference characters represent similar parts throughout the several views.

The device includes a roof 5, to the under side of which is attached an attracting device 6 which is herein shown as comprising an incandescent lamp comprising a bulb 7, to attract nocturnal insects. The bulb is secured in a socket 8 attached to the roof by means of bolts 9, and nuts 10.

Arms 11 are secured, at their upper ends in any convenient manner, to the roof 5 and extend downwardly and outwardly therefrom. The lower ends 12 of the arms extend under the rim 13 of a funnel 14 to which they are secured to support the latter under the bulb 7.

The insect, after being attracted by the light, tends to fly around the bulb 7 and close to it. The flight however is broken by any one of a plurality of baffle plates 15 each extending inwardly from the one of the funnel supporting arms 11. When the flight of the insect is broken it drops into the funnel 14 and is thereby deposited into a jar 16, the jar being screwed into a cap or cover 17 which cover is secured to the lower end 18 of the funnel 14, said lower end 18 extending a short distance through the cap 17 to make it difficult for the bug to crawl out of the jar, thus trapping the insect or bug.

By an inspection of Figs. 1 and 3, it will be noticed that each baffle plate 15 has a portion 15a bent around the arm 11 and that it is secured thereto by a series of pointed members or nubs 15b each extending into an individual depression 15c in the arm 11, these members and depressions being formed by any suitable tool such, for example, as a center punch. This is done after the folded end 15a of the baffle plate has been placed around the arm 11. It will be understood that by securing the baffle plates 15 to their arms in this manner they are not only held thereon against detachment therefrom but are also held against sliding longitudinally thereon.

The baffle plates 15 also serve as reflectors of the light rays emanating from the bulb 7, and the herein disclosed baffle plates are especially constructed and placed in the device so as to more effectively reflect the light rays. To this end each baffle plate 15 is arranged with respect to the bulb 7 so that a vertical plane extending in the general direction of the baffle plate makes an acute angle with a vertical plane extending radially from the bulb through the supporting arm 11. Each baffle plate 15 is also corrugated so as to present two curved surfaces 19 and so, each surface reflecting some of the light rays in opposite direction to those reflected by the other surface. The angular ranges of light rays reflected from the surfaces 19 and 20 are indicated by B and C respectively, and the angular range of the direct light rays emanating from the bulb and extending between the baffle plates is indicated by A.

It will be understood that the device may be set on the ground but it is desirable to have it some distance from the ground. It is therefore provided at its upper end with a handle 21 attached to the roof 5 by S-shaped hooks 22, and by which handle the device or trap may be suspended from a hook 23 herein shown as formed at the upper end of a stake 24 which may be driven into the ground. Conductors 25 and 26 are connected at their ends to binding posts on the socket 8. The opposite ends of said conductors may be connected to a suitable plug by which they may be connected to a power supply line.

Having thus described the invention it will be understood that changes and alterations may be made without departing from the spirit thereof as defined in the appended claims.

I claim:

1. A plurality of baffle plates for use in an insect trap having a lamp, and a receptacle beneath it and the baffle plates, each baffle plate being bent so as to present portions of its two opposite faces to the light rays of the lamp to reflect the light in opposite directions from each baffle plate.

2. A plurality of baffle plates for use in an insect trap having a lamp and a receptacle, the baffle plates being arranged about said lamp and above the receptacle, each baffle plate being bent and the general plane of each baffle plate being tangent to a circle about the axis of the lamp so as to cause the bent portions to reflect the light rays from the lamp in opposite directions.

3. A baffle plate for use in an insect trap having a lamp and a receptacle beneath it, the baffle plate having two surfaces, a portion of one of its surfaces being angularly disposed with reference to a portion of the other and with reference to the rays of light from the lamp so as to reflect the light from the lamp in opposite directions.

4. A baffle plate for use in an insect trap having a lamp and a receptacle beneath it, a supporting bar for each baffle plate, one edge of said baffle plate being bent to fit around said bar to embrace it, and nubs on said bent end extending into depressions in said bar to hold the baffle plate on said bar.

5. In an insect trap, the combination with a lamp, of a plurality of baffle plates arranged about said lamp, each baffle plate being bent throughout its length to present, at different distances from the lamp, a portion of each surface thereof to reflect the light rays from the lamp in opposite directions.

6. In an insect trap, the combination with a lamp, of a plurality of baffle plates arranged about said lamp and equally spaced from each other, each baffle plate being bent to present to the light rays of the lamp, a portion of each surface thereof, each portion to reflect the light rays of the lamp in a direction opposite to that of the other portion and through the spaces between said baffle plate and the adjacent baffle plate without obstruction by said adjacent baffle plate.

HENRY L. NIEMEYER.